United States Patent
Eren et al.

(10) Patent No.: US 7,844,508 B2
(45) Date of Patent: Nov. 30, 2010

(54) ON-DEMAND MONITORING OF COMPONENT CONVERGENCE FOR CUSTOMER SOLUTION INTEGRATION

(75) Inventors: Selcuk Suat Eren, Chapel Hill, NC (US); Brian Jules Jaeger, Chapel Hill, NC (US); Douglas Alan Law, Chapel Hill, NC (US); Paul Allen Roberts, Raleigh, NC (US); Shawn Konrad Sremaniak, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1087 days.

(21) Appl. No.: 11/539,687

(22) Filed: Oct. 9, 2006

(65) Prior Publication Data

US 2008/0201245 A1 Aug. 21, 2008

(51) Int. Cl.
*G06Q 10/00* (2006.01)
(52) U.S. Cl. ....................................................... 705/28
(58) Field of Classification Search .................... 705/28
See application file for complete search history.

(56) References Cited

U.S. PATENT DOCUMENTS

| | | | |
|---|---|---|---|
| 6,883,710 B2 | 4/2005 | Chung | |
| 7,267,270 B2 * | 9/2007 | Hopwood et al. | 235/384 |
| 7,518,511 B1 * | 4/2009 | Panja et al. | 340/572.1 |
| 7,641,104 B1 * | 1/2010 | Leon et al. | 235/375 |
| 2004/0024644 A1 | 2/2004 | Gui et al. | |
| 2005/0080680 A1 | 4/2005 | Elam et al. | |
| 2006/0282340 A1 * | 12/2006 | Morand et al. | 705/28 |
| 2007/0000989 A1 * | 1/2007 | Kadaba | 235/375 |
| 2007/0126578 A1 * | 6/2007 | Broussard | 340/572.1 |

FOREIGN PATENT DOCUMENTS

WO 2005098558 A1 10/2005

OTHER PUBLICATIONS

"King's Daughters Medical Center Reduces Costs Through Deployment of Mobile Aspects RFID Technology". Business Wire, Sep. 18, 2006.*

(Continued)

*Primary Examiner*—Matthew S Gart
*Assistant Examiner*—Oluseye Iwarere
(74) *Attorney, Agent, or Firm*—Yee & Associates, P.C.; Steven L. Bennett (57) ABSTRACT

A system and method for coordinating delivery of components to manage solution delivery and installation to customers. When a customer order for components is received, a component tracking device is configured to be placed within one or more pre-designated areas of a customer site. Each component to be shipped to the customer site is tagged with a radio frequency identification (RFID) tag that is associated with the order. The tracking device is used to detect the presence of each component at the pre-designated areas within the customer site. An RFID reader in the tracking device detects the presence of a component by reading the RFID tag on the component. Data about the presence of each component is recorded. An installation team may be notified when the recorded data indicates that a number of components in the order have been detected within the pre-designated areas of the customer site.

15 Claims, 4 Drawing Sheets

OTHER PUBLICATIONS

Neil, "Breaking Through the Supply Chain", Managing Automationvol. 19, No. 6, pp. 34-36, Jul. 2004, http://www.managingautomation.com/maonline/magazine/read/753668?printable.

Gabriel, "RFID: The Convergence of Microsystems and Logistics", mst news, Int'l Newsletter on Micro-Nanco Ingration, Applications in Logistics, No. 5/04, pp. 6-9, Oct. 2004 http://www.mstnews.de/Homepage/mstnews-static/pdf_aktuell/news_0504.pdf.

Malykhina, "New Jets will come Equipped with RFID", InformationWeek, pp. 1-3, Nov. 29, 2004 http://222.informationweek.com/story/showArticle.jhtml?articleID=54200591.

"WhereNet" retrieved Aug. 18, 2006, pp. 1-8. http://www.wherenet.com/products_main.shtml.

Seawright et al., "Utilization of radio frequency identification systems for tracking of complete knock-down containerized parts as part of a just-in-time automobile manufacturing system", Tracking, Identification and Control: Proceedings of the 1st International Conference, Nov. 1988, London UK, INSPEC abstract, 1 page.

* cited by examiner

ON-DEMAND MONITORING OF COMPONENT CONVERGENCE FOR CUSTOMER SOLUTION INTEGRATION

BACKGROUND OF THE INVENTION

1. Field of the Invention

The present invention relates generally to an improved data processing system, and in particular, to a computer implemented method, data processing system, and computer program product for coordinating delivery of components to manage solution delivery and installation to customers.

2. Description of the Related Art

A supply chain is a network created among different companies for producing, handling, and/or distributing specific products. A product in a supply chain may be moved in a physical or virtual manner from a supplier to a customer. A solution fulfillment team within a company may manage the supply chain and control the flow of resources, including distribution capacity, inventory, and labor. The objective of the solution fulfillment team is to fulfill customer orders and provide solutions through the most efficient use of the resources.

The solution fulfillment team is responsible for managing the supply chain to deliver a seamless transaction with the customer when an order is processed. However, in large installations, a customer may end up purchasing a solution that contains hundreds of product components shipped from several different distribution sites. In addition, to ensure a smooth transition to the customer, the solution fulfillment team may send a deployment team to the customer site to unpack, setup, install, configure, and test the solution. Although the deployment team may be in place to install the solution, current problems that may occur using existing supply chain delivery and installation techniques include the components being lost during shipment, wrong components being delivered to the customer, components being misplaced at the customer site, and components in the wrong installation location at the customer site. These problems can result in delays and additional costs for multiple trips of the deployment teams to customer sites, as well as poor customer satisfaction.

Several methods in the current art are used to determine the inventory of solution components at a customer site for delivery and installation. One method comprises having the customer perform a manual inventory of components at the customer site. As this method causes more work for customers, it can result in poor customer satisfaction, as well as cause problems due to the potential for human error. Another method comprises tracking the delivery of components to the customer site via delivery carrier. However, a disadvantage to this method is that although the solution fulfillment team may know that the components have been, at some point in time, delivered to the company, there is no guarantee that the delivered components are currently at the correct location within the customer site when the deployment team arrives. The components may be misplaced within the customer site, or the components may be at an incorrect installation location at the site.

BRIEF SUMMARY OF THE INVENTION

The illustrative embodiments provide a computer implemented method, data processing system, and computer program product for coordinating delivery of components to manage solution delivery and installation to customers. When an order for components is received from a customer, a component tracking device is configured to be placed within one or more pre-designated areas of a customer site. Each component to be shipped to the customer site is tagged with a radio frequency identification tag that is associated with the order. The component tracking device is used to detect the presence of each component at the pre-designated areas within the customer site. A radio frequency identification reader in the component tracking device detects the presence of a component by reading the radio frequency identification tag on the component. Data about the presence of each component is recorded. An installation team may be notified when the recorded data indicates that a number of components in the order have been detected within the pre-designated areas of the customer site.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
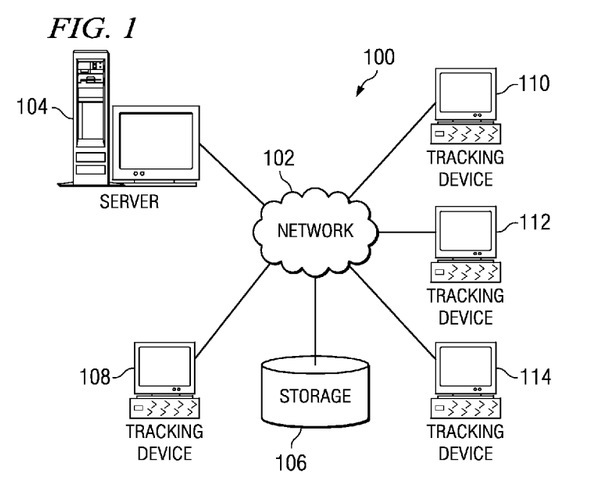
FIG. 1 depicts a pictorial representation of a distributed data processing system in which the illustrative embodiments may be implemented.
Figure 2:
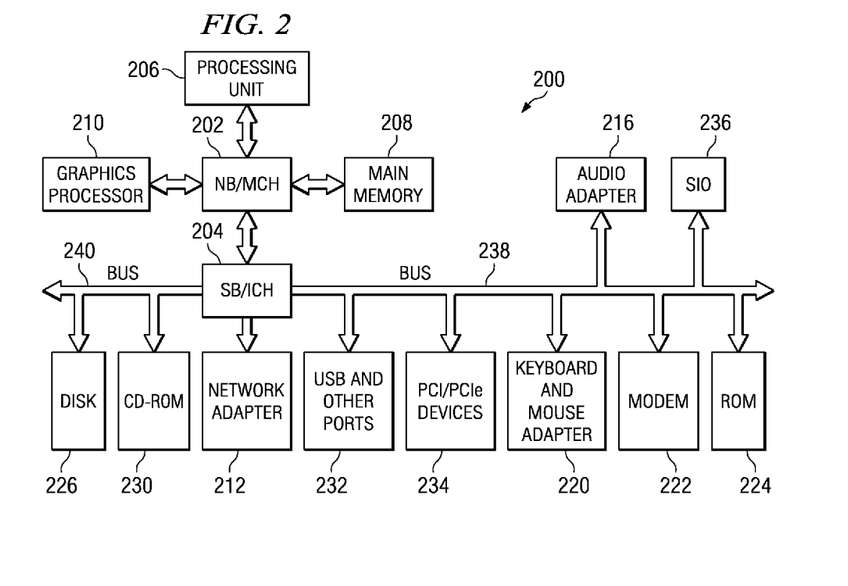
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 connects to network 102 along with storage unit 106. In addition, tracking devices 108, 110, 112, and 114 connect to network 102. These tracking devices 108, 110, 112, and 114 may be, for example, self contained basic computing systems with a network, modem, or other connectivity means, and an RFID reader. In the depicted example, server 104 obtains data, such as product component tracking data, from tracking devices 108, 110, 112, and 114. Network data processing system 100 may include additional servers, clients, tracking devices, and other devices not shown. FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 in FIG. 1, in which computer usable code or instructions implementing the processes in the illustrative embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments disclose a system and method which provide a significant improvement to the fulfillment process for large complex solutions. The system allows a fulfillment team to obtain an accurate inventory at the customer site of solution components in the customer order. The system determines the inventory at the customer site by monitoring the site for the presence of the solution components. This inventory information may then be used to coordinate and manage the delivery of components to the customer site to enable an efficient installation of the components in the solution. For instance, the inventory information may be used to detect missing or incorrect components as well as to determine when components are presently located in the designated installation areas. An installation area is a pre-designated area at a customer site which includes any location where a solution product or sub-product build may be performed. In other words, a customer site may include multiple areas in which sub-components of the solution may be built, and a final installation location in which the final solution product is assembled. The fulfillment team may determine that it is time to deploy an installation team to the customer site based on various factors, such as, for example, upon detecting that some or all necessary components are present at one or more installation areas in the customer site, or upon determining that the necessary components will arrive at a particular installation area by the time the deployment team arrives at that area for installation.

The solution provided in the illustrative embodiments is transparent to the customer, as the solution does not rely on customer participation. By determining if the components necessary for the solution are present in the designated installation areas prior to deploying the installation team, errors and delays which can occur in a typical installation process may be reduced. In this manner, coordinating the delivery and installation of the components will provide significant cost savings and increased customer satisfaction.

Figure 3:
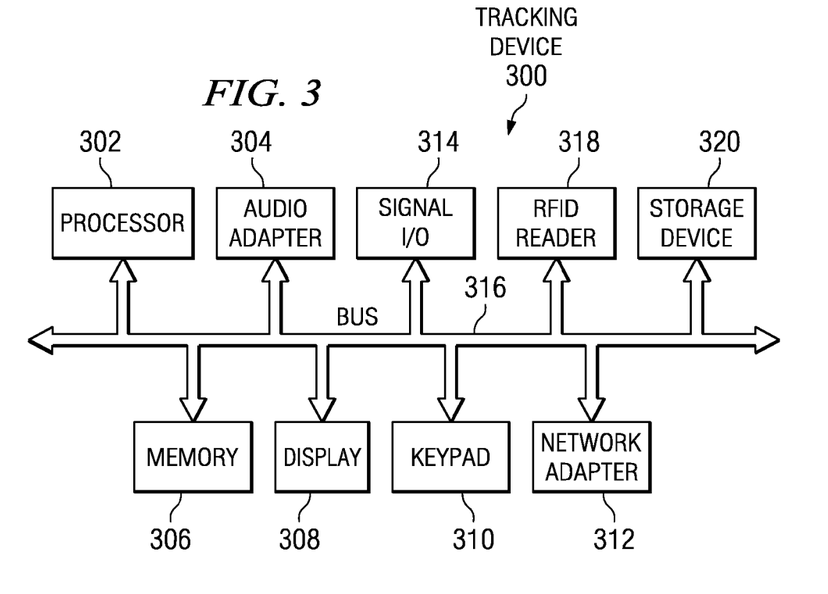
FIG. 3 is a block diagram of an exemplary tracking device in accordance with the illustrative embodiments.

Turning now to FIG. 3, a block diagram of a tracking device in accordance with the illustrative embodiments is shown. Tracking device 300 is an example of tracking devices 108-114 in FIG. 1 which may be placed in pre-designated areas within a customer site. In the illustrative embodiments, tracking device 300 is a self-contained basic computing system with a network, modem, or other connectivity (including wireless cellular or wireless Ethernet) means and an RFID reader. Tracking device 300 is preprogrammed to monitor for the presence of RFID tags placed on solution components that are located within a customer site and report the status (e.g., location, timestamp information, etc.) of these tags back to the coordination fulfillment team.

Processor 302, audio adapter 304, memory 306, display 308, keypad 310, network adapter 312, signal input/output (I/O) 314, RFID reader 318, and storage device 320 are connected via bus 316. Bus 316 may be comprised of one or more buses, such as a system bus and/or an I/O bus. Bus 316 may be implemented using any type of communications fabric or architecture that provides for a transfer of data between different components or devices attached to the fabric or architecture.

Processor 302 may include one or more processors or CPUs. Memory 306 may be a main memory, a read only memory (ROM), a random access memory (RAM), flash memory, a cache, or any other known or available memory for storing data, instructions, and/or computer usable program code. Tracking device 300 may retrieve data, instructions, and/or code from memory, such as main memory or read only memory. In addition, tracking device 300 may retrieve data, instructions, and/or code from a remote memory location via a network connection.

Optional components within tracking device 300 include display 308 and keypad 310. Display 308 may include a touch screen display, an LED display, or any other type of known or available display for presenting output to a user or receiving input from a user. Keypad 310 is any type of known or available alphanumeric keypad for a user to provide input in the form of data, instructions, or program code to tracking device 300.

Network adapter 312 is coupled to the system to enable the computing system to become coupled to other data processing systems or remote printers or storage devices through intervening private or public networks. Network adapter 312 may include any means for wireless network connectivity. Modems, including wireless modems such as broadband cellular cards, and cable modem and Ethernet cards are just a few of the currently available types of network adapters.

Signal input/output 314 includes one or more devices for sending and receiving signals to and from different components in a storage unit, such as a digital display and keypad, a touch screen, a voice recognition interface, an LED display, and/or any other known or available devices for sending and receiving input and output.

RFID reader 318 is an identification tag reader which transmits a signal to detect the presence of RFID tags placed on the solution components located within the customer site.

Storage device 320 is also optionally connected to bus 316. Storage device 320 may include any type of permanent and removable storage media. In addition, storage device 320 may include a remote storage device or storage provided by a storage service. Program code and instructions are located on storage device 320 and may be loaded into memory 306 for execution by processor 302.

Processes in the illustrative embodiments may be performed by processor 302 using computer implemented instructions, which may be located in memory 306. Processor 302, memory 306, signal input/output 314, and storage device 320 are functional components that may be implemented as functions in an application specific integrated circuit rather than using a processor paradigm.

It should be noted that tracking device 300 may be configured as part of the customer order. For instance, the number of tracking devices deployed, the locations that the devices are placed within the customer site, or the communication type of RFID reader 318 may be generated as orderable items similar to how the actual system components may be ordered.

Figure 4:
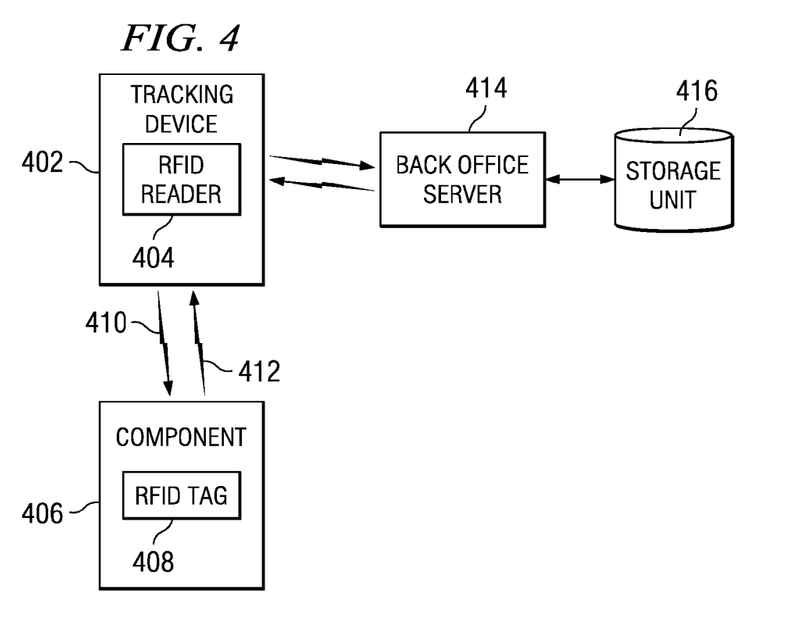
FIG. 4 is a block diagram illustrating an interaction of a tracking device with a Radio Frequency Identification (RFID) reader and a product component with an RFID tag in accordance with the illustrative embodiments.

FIG. 4 is a block diagram illustrating an interaction of a tracking device with an RFID reader and a solution component with an RFID tag in accordance with the illustrative embodiments. As previously mentioned, tracking device 402 is a solution component tracking device, such as tracking device 300 in FIG. 3, and is positioned within a pre-designated area of a customer site. RFID reader 404 within tracking device 402 is activated to generate a signal. As component 406 is moved around in the customer site to within the interrogation zone of RFID reader 404, signal 410 generated by tracking device 402 is received by RFID tag 408 in component 406. In response to receiving signal 410, RFID tag 408 generates response signal 412 via an antenna on the RFID tag.

When tracking device 402 receives response signal 412, tracking device 402 records the component data received in response signal 412. The component data includes information about component 406. Tracking device 402 may then provide the recorded component data to back office server 414. This component data may either be pulled from tracking device 402 or periodically pushed to back office server 414 in order to determine which components are present at the customer site. For instance, the component data may be provided to back office server 414 using a simple email transaction which reports the presence of each new RFID tag in the pre-designated area. Back office server 414 may also access the tracking device 402 and "pull" the component data from the device. Tracking device 402 may also be configured to "push" the component data at regular intervals to back office server 414.

Back office server 414 may be associated with a storage unit 416 containing a list of component identification numbers, component descriptions, and associated customer orders. Back office server 414 may analyze the recorded component data to identify the solution component detected and determine the associated customer order using the information in storage unit 416.

Figure 5:
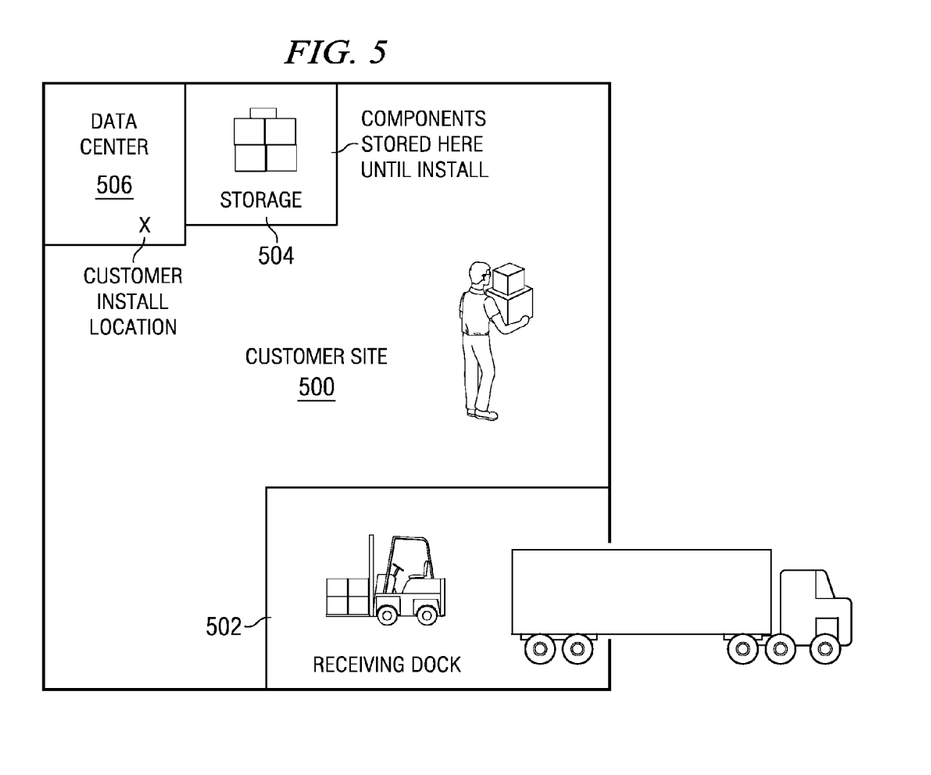
FIG. 5 is a block diagram of an exemplary customer site in which the illustrative embodiments may be implemented.

FIG. 5 is a block diagram of an exemplary customer site in which the illustrative embodiments may be implemented. Within customer site 500, one or more tracking devices are placed in pre-designated areas to monitor for the presence of each solution component at the customer's desired installation locations. The use of multiple tracking devices is beneficial for large customer sites where the customer may have a loading dock, a storage area, and a datacenter area where the solution will ultimately be set up. A tracking device may be placed in each area, thereby allowing the coordination fulfillment team to track the components as the components are moved from the receiving area to the area where the solution will be installed. This arrangement is especially useful in large sites where it may take days or weeks from when a shipment arrives at a customer site and is moved through the company's internal processes to the installation locations.

In this particular example, the tracking devices are placed within receiving dock 502, storage area 504, and data center (installation area) 506, although a tracking device may be placed in any location at a customer site in which the coordination fulfillment team wants to monitor the solution components. As previously mentioned, a customer site may include multiple installation areas in which sub-products of the solution may be built prior to assembling the final solution. As the components in the customer order arrive at the customer site for installation, RFID tags located on each component are detected by the tracking devices in each pre-designated area. For example, when a shipment of components arrives at receiving dock 502 of the customer site, a tracking device located in the receiving dock detects the presence of the RFID tags on each component and records data about each component. This component data may be provided to back office server 414 in FIG. 4, wherein the detected components and their associated customer orders may be identified.

Tracking devices placed within the other areas of the site allow the coordination fulfillment team to track the components within the site and obtain a near real-time status of the component locations. For instance, as a component detected by the tracking device in receiving dock 502 is moved to storage area 504, the tracking device within storage area 504 will now detect the presence of the component. The component data recorded by the tracking device is again provided to the coordination fulfillment team, thereby informing the team that the component, once located in receiving dock 502, is presently located in storage area 504. If the customer site has multiple installations areas, each of the installation areas may also be equipped with a tracking device to detect the presence of components within that particular installation area.

As each detected component is identified, the coordination fulfillment team may review the list of detected components and compare the list to its schedule of component arrival dates for the installation. The comparison allows the coordination fulfillment team to quickly identify missing or incorrect parts at the customer site and ship out replacement parts before the deployment team arrives at the customer site. The fulfillment team may deploy an installation team to the customer site when the some or all components in the solution are present at the installation areas. For instance, if the coordination fulfillment team retrieves a complete list of components in an order from the tracking devices at the customer site, the coordination fulfillment team knows all components are in the correct locations and thus the installation team may be deployed to the customer site for an efficient installation process. The coordination fulfillment team may also deploy the installation team upon receiving a partial list of components in the order from the tracking devices at the customer site in anticipation that the remaining components will arrive at the installation areas by the time the deployment team arrives for the installation process.

Figure 6:
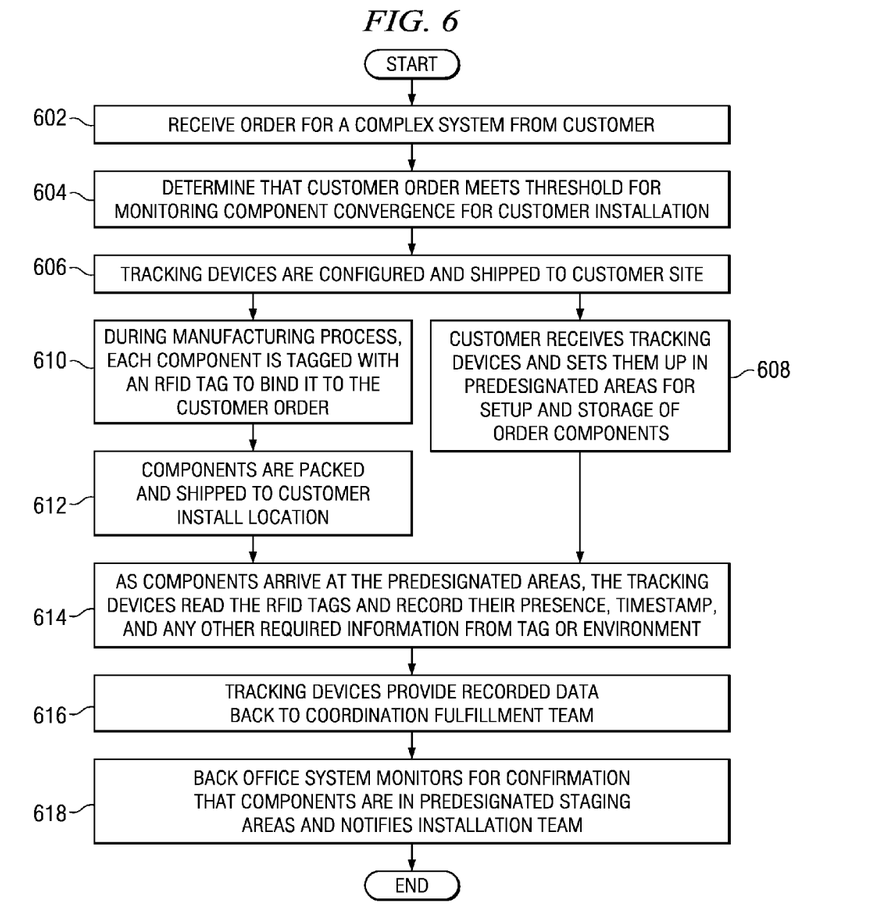
FIG. 6 is a flowchart of a process for coordinating delivery of components to manage solution delivery and installation to customers in accordance with the illustrative embodiments.

FIG. 6 is a flowchart of a process for coordinating delivery of components to manage solution delivery and installation to customers in accordance with the illustrative embodiments. The process begins when an order for a complex system is received from a customer (step 602). The order is then checked to determinate that the order meets a threshold for using the coordination system to monitor the delivery of components to coordinate the installation process (step 604). The threshold may be defined by the coordination system provider as a characteristic of the order. One example of a threshold based on a characteristic of the order is the number of components that are shipped as part of the solution. For instance, the coordination system will be used to monitor the delivery and presence of the components if the solution has more than "X" number of components to install (i.e., threshold) at the customer site. The tracking devices, such as tracking device 300 in FIG. 3, are then configured and shipped to the customer site (step 606).

When the customer receives the tracking devices, the tracking devices are arranged in pre-designated areas at the customer site for setup and storage of the order components (step 608). During the manufacturing process, each component is tagged with an RFID tag to bind the component to the customer order (step 610). The manufacturing process may occur as the tracking boxes are being shipped to the customer site and setup in the pre-designated areas in step 608. The tagged components are then packed and shipped to the customer installation site (step 612).

As the tagged components are received at the pre-designated areas of the customer site, tracking devices for each pre-designated area read the RFID tags on the components and record their presence (step 614). The tracking devices may also record the timestamp of when the component was detected, as well as any other required information from the RFID tag or the environment. The tracking devices may then provide the recorded data to the coordination fulfillment team (step 616). Examples of providing the data include emailing each recorded transaction to the back office system, allowing the fulfillment team to login to the tracking box and query the data, or systematically broadcasting the recorded data, among others.

When the back office system monitors confirms that the required components in the order are situated in the correct installation locations, the deployment team may be notified that the installation process may begin (step 618).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for coordinating delivery of components to manage solution delivery and installation to a customer, the computer implemented method comprising:

responsive to receiving an order for components from the customer, configuring component tracking devices to be placed within a customer site based on the order, wherein the order specifies a number of component tracking devices to be deployed and a plurality of pre-designated areas in the customer site, wherein a component tracking device in the number of component tracking devices is placed in each pre-designated area of the plurality of pre-designated areas to allow for tracking the components as the components are moved throughout the customer site;

tagging each component to be shipped to the customer site with a radio frequency identification tag that is associated with the order;

responsive to receipt of the components at the customer site, detecting a presence of each component at the pre-designated areas within the customer site using the component tracking device, wherein a radio frequency identification reader in the component tracking device detects the presence of a component by reading the radio frequency identification tag on the component;

recording data about the presence of each component at each pre-designated area in the customer site;

using the recorded data to determine that a number of components have arrived at an installation area in the customer site, wherein an installation area is an area in which a product or sub-product is built from the components by an installation team; and notifying the installation team when the recorded data indicates that the number of components in the order have been detected within the installation area of the customer site.

2. The computer implemented method of claim 1, wherein the component tracking device provides the recorded data to a back office system by one of emailing the recorded data to the back office system, allowing the back office system to access the recorded data on the component tracking device, or broadcasting the recorded data at regular intervals to the back office system.

3. The computer implemented method of claim 1, wherein the recorded data includes timestamp information.

4. The computer implemented method of claim 1, wherein the plurality of pre-designated areas includes a receiving dock, a storage area, and at least one installation area.

5. The computer implemented method of claim 1, further comprising:

comparing the recorded data to a schedule of component arrival dates to identify missing or misplaced components at the customer site.

6. A data processing system for coordinating delivery of components to manage solution delivery and installation to a customer, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to configure, in response to receiving an order for components from the customer, component tracking devices to be placed within a customer site based on the order, wherein the order specifies a number of component tracking devices to be deployed and a plurality of pre-designated areas in the customer site, wherein a component tracking device in the number of component tracking devices is placed in each pre-designated area of the plurality of pre-designated areas to allow for tracking the components as the components are moved throughout the customer site, tag each component to be shipped to the customer site with a radio frequency identification tag that is associated with the order, detecting a presence of each component at the pre-designated areas within the customer site using the component tracking device in response to receipt of the components at the customer site, wherein a radio frequency identification reader in the component tracking device detects the presence of a component by reading the radio frequency identification tag on the component, record data about the presence of each component at each pre-designated area in the customer site, use the recorded data to determine that a number of components have arrived at an installation area in the customer site, wherein an installation area is an area in which a product or sub-product is built from the components by an installation team, and notify the installation team when the recorded data indicates that the number of components in the order have been detected within the installation area of the customer site.

7. The data processing system of claim 6, wherein the component tracking device provides the recorded data to a back office system by one of emailing the recorded data to the back office system, allowing the back office system to access the recorded data on the component tracking device, or broadcasting the recorded data at regular intervals to the back office system.

8. The data processing system of claim 6, wherein the processing unit further executes the computer usable code to compare the recorded data to a schedule of component arrival dates to identify missing or misplaced components at the customer site.

9. A computer program product for coordinating delivery of components to manage solution delivery and installation to a customer, the computer program product comprising:

a computer usable storage medium having computer usable program code tangibly embodied thereon, the computer usable program code comprising:

computer usable program code for configuring, in response to receiving an order for components from the customer, component tracking device to be placed within a customer site based on the order, wherein the order specifies a number of component tracking devices to be deployed and a plurality of pre-designated areas in the customer site, wherein a component tracking device in the number of component tracking devices is placed in each pre-designated area of the plurality of pre-designated areas to allow for tracking the components as the components are moved throughout the customer site;

computer usable program code for tagging each component to be shipped to the customer site with a radio frequency identification tag that is associated with the order;

computer usable program code for detecting a presence of each component at the pre-designated areas within the customer site using the component tracking device in responsive to receipt of the components at the customer site, wherein a radio frequency identification reader in the component tracking device detects the presence of a component by reading the radio frequency identification tag on the component;

computer usable program code for recording data about the presence of each component at each pre-designated area in the customer site;

computer usable program code for using the recorded data to determine that a number of components have arrived at an installation area in the customer site, wherein an installation area is an area in which a product or sub-product is built from the components by an installation team; and computer usable program code for notifying the installation team when the recorded data indicates that the number of components in the order have been detected within the installation area of the customer site.

10. The computer program product of claim 9, wherein the component tracking device provides the recorded data to a back office system by one of emailing the recorded data to the back office system, allowing the back office system to access the recorded data on the component tracking device, or broadcasting the recorded data at regular intervals to the back office system.

11. The computer program product of claim 9, wherein the recorded data includes timestamp information.

12. The computer program product of claim 9, wherein the plurality of pre-designated areas includes a receiving dock, a storage area, and at least one installation area.

13. The computer program product of claim 9, further comprising:

computer usable program code for comparing the recorded data to a schedule of component arrival dates to identify missing or misplaced components at the customer site.

14. The computer implemented method of claim 1, further comprising:

using the recorded data to determine when a number of components will arrive at an installation area in the customer site; and notifying the installation team that the recorded data indicates when the number of components in the order will arrive within the installation area of the customer site.

15. The computer implemented method of claim 1, wherein the plurality of component tracking devices are configured to be placed within the customer site only if a number of components requested in the order from the customer meets a threshold.

* * * * *